A. W. Hall,

Water Meter.

No. 87,664.　　　　Patented Mar. 9, 1869.

Witnesses,

Inventor,
A W Hall

UNITED STATES PATENT OFFICE.

A. W. HALL, OF NEW YORK, N. Y.

Letters Patent No. 87,664, dated March 9, 1869.

IMPROVEMENT IN WATER-METER.

The Schedule referred to in these Letters Patent and making part of the same.

*To all whom it may concern:*

Be it known that I, A. W. HALL, of the city, county, and State of New York, have invented a new and useful Improvement in Water-Meters; and I do hereby declare that the following is a full, clear, and exact description of the same, reference being had to the accompanying drawings, forming a part of this specification, in which—

Figure 1:
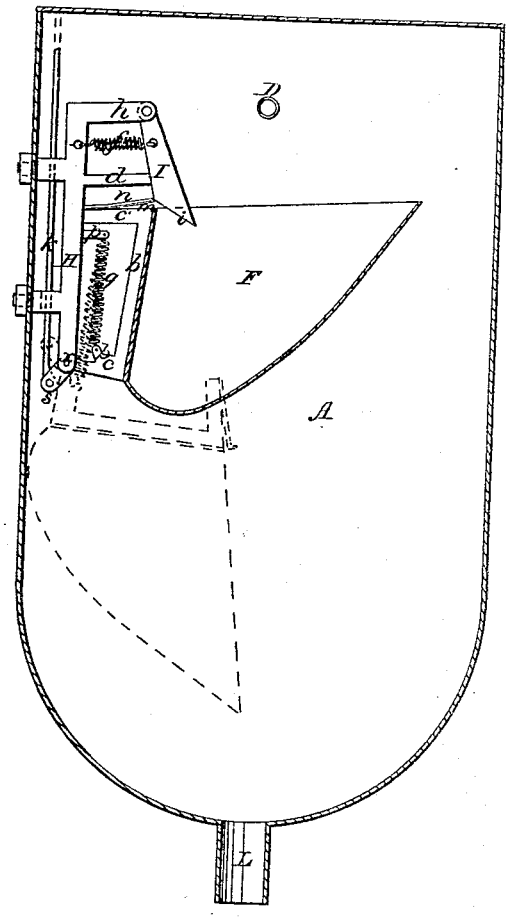
Figure 2:
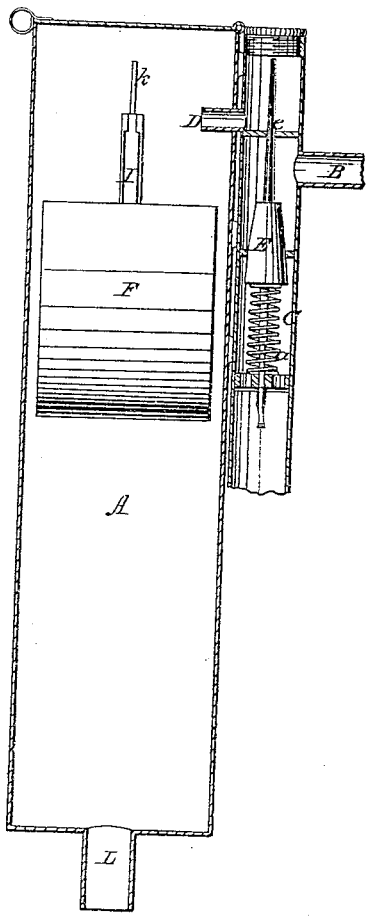

Figures 1 and 2 represent vertical sections of a water-meter, constructed according to my improvement, taken at right angles to each other.

Similar letters of reference indicate corresponding parts in both figures.

The invention consists in a certain means, whereby a certain exact proportion of the water entering the service-pipe is separated for measurement; which said proportion, when measured, serves as an index for the measurement of the quantity used.

In order that others may understand the construction and operation of my invention, I will proceed to describe it with reference to the drawings.

A is a case or box, for containing the apparatus. Said case is of a formation somewhat resembling that of the ordinary gas-meter, but may be of any desirable form, and is constructed of sheet-tin, cast-metal, or any other suitable material.

B represents the service-pipe;

C, the distributing-pipe, leading through the building, or other place of consumption; and D is a smaller pipe, leading to the meter.

E e is a compound taper-plug, longitudinally arranged within a perpendicular portion of the pipe, and held to its seat by means of a spiral spring, a. Said spring a, is of sufficient strength to sustain but little more than the weight of the plug, so that it may yield to the slightest pressure of the water; or, the arrangement of said plug may be inverted, so that its own weight will act, in place of said spring, for closing the valve.

The larger and smaller portions, E e, of this said compound taper-plug, are graduated and proportioned, in their relation to each other, at all points of their length, so that the greater or less opening, at the plug E, will effect a proportionate opening of the plug e, and consequently, when a given quantity of water is passed out by the plug E, a given proportion of that quantity is allowed to pass out by the smaller plug, e.

F is a self-dumping and self-locking cup or bucket, of a formation, as represented in the drawings, for the more rapid and effectual ridding itself of the water by its dumping or upsetting-movement.

Said cup or bucket has secured, upon its rear or perpendicular side, a vertically-arranged bar, b, with rearwardly-projecting studs, c c', the lower one of which is hinged to the lower extremity of a frame, H, secured to the inner surface of one side of the box A.

Said cup or bucket F, is located directly under the termination of the pipe D, so as to receive or catch the water that passes through said pipe.

At the upper extremity of the frame H, projects a horizontal arm, h, to the outer end of which is pivoted a lever, I, with bevelled lower extremity, i.

This lever I is retained in place against a stop, d, of the frame H, by means of a spring, f, connected, by its extremities, to the said lever I and frame h.

g is a spring, with its extremities connected to the bar b and frame H, by means of suitable hooks or staples, p p', and is designed for elevating the cup or bucket F from its tilted or dumped position after the water has been emptied.

The said spring g is constructed with a proper degree of strength, to elevate the cup F from its tilted position when empty, and to yield to the weight of the same when filled with water; and is also so arranged, in relation to the pivot or hinge, x, upon which the cup F turns, that the resistance of the spring becomes less in proportion to the tilting of the cup. By this arrangement, provision is made for the gradual emptying of the cup while in the act of being tilted, without the danger of its being drawn upward by said spring g, before all the water shall have run out.

Upon the upper side of the projection or stop, $c'$, is provided a spring, m, for locking behind the lever I, thereby to hold the cup F level, and prevent it from dumping while being filled.

This spring m is or may be provided with a stay, n, for supporting the same while locking the cup, thereby allowing the said spring to be constructed of a very flexible character, so as to present as little resistance as possible to the locking of the cup as it rises.

k is a rod, pivoted to a lower projection or short lever, s, of the stud c, and passing upwardly, through suitable bearings in the frame H, so that the falling and rising of the cup will produce the raising and lowering of the rod.

Said rod k, is designed for connection with and operation of any suitable registering-device.

L is a waste-pipe, leading out from the bottom of the case A, for eduction of the water discharged therein, from time to time, by the tilting or dumping of the cup.

When a cock or faucet, connected with the distributing-pipe, C, is opened, the pressure of the water entering from the service-pipe B, forces open the plug E, thereby opening, also, the smaller plug e, and while a given quantity of water is passing out between the plug E and its seat, a given fractional proportion of such quantity is also passing out between the plug e and its seat.

The water passing through or by the plug e, is conducted by the pipe D, and discharged into the cup F.

When the said cup F is full, its weight, together with the weight of the water, overcomes the resistance of the spring f, and the lever I is forced back by the spring *m*, assisted, it may be, by the stay *n*, and the weight of the water in the cup, overcoming the spring *g*, carries the said cup downward, turning upon its pivot or hinge *x*, until it is caused to assume a position indicated by red outlines in fig. 1, and, simultaneously, pushing up the rod *k*. In this position of the cup, the water therein contained, runs out, and the cup, being greatly lightened thereby, is carried up, by the force of the spring *g*, and locked to the lever I by means of the spring *m*. The cup or bucket is stopped at the right position, by the stop *c′* coming in contact with the frame H.

Weights, suitable for effecting the same purpose, I consider the equivalent of springs, and may, when desirable, be used in the place of the springs *f*, *m*, and *g*.

What I claim as my invention, and desire to have secured by Letters Patent, is—

1. The compound taper-plug E *e*, constructed and applied, relatively to the service-pipe B, to operate substantially as and for the purpose herein set forth.

2. The combination, with the bucket F, of the stops *c′ d*, springs *f g m*, and locking-lever I, substantially as and for the purposes herein set forth.

A. W. HALL.

Witnesses:
J. C. LAWRENCE,
L. BEACH.